United States Patent [19]

Bonerb

[11] Patent Number: 4,534,596
[45] Date of Patent: Aug. 13, 1985

[54] FREIGHT VEHICLE WITH A CONVERTIBLE CARGO SPACE

[75] Inventor: Timothy C. Bonerb, East Amherst, N.Y.

[73] Assignee: Vincent C. Bonerb, Boston, N.Y.

[21] Appl. No.: 480,499

[22] Filed: Mar. 30, 1983

[51] Int. Cl.³ .............................................. B60P 1/56
[52] U.S. Cl. ..................................... 298/27; 105/243; 296/10; 298/24
[58] Field of Search ................. 105/243, 359; 296/10; 298/24, 27, 28

[56] References Cited

U.S. PATENT DOCUMENTS

| | | | |
|---|---|---|---|
| 2,712,797 | 7/1955 | Woehrle et al. | 298/7 X |
| 3,583,330 | 6/1971 | Freudman | 105/243 X |
| 3,756,469 | 9/1973 | Clark et al. | 298/24 X |
| 3,918,604 | 11/1975 | Kersten | 105/243 X |
| 4,092,051 | 5/1978 | D'Orazio | 105/243 X |
| 4,155,469 | 5/1979 | Cole | 105/243 X |
| 4,241,947 | 12/1980 | Schroder | 105/243 X |
| 4,421,250 | 12/1983 | Bonerb et al. | 222/105 X |

FOREIGN PATENT DOCUMENTS 1144162  3/1969  United Kingdom .

OTHER PUBLICATIONS

Converta-Vans, Models 4-V, S-D, 2L-G, 35-G.

Primary Examiner—Jeffrey V. Nase
Attorney, Agent, or Firm—Bernard, Rothwell & Brown

[57] ABSTRACT

A freight vehicle has a cargo space convertible from that suitable for handling piece goods to that suitable for dry bulk granular material. A conventional cargo space for piece goods has openings in the roof and floor for filling and discharging bulk material. A double-wall inflatable bag having its bottom attached to a rigid support platform is positioned in erected condition to handle bulk material and is movable to a stored position near the roof of the cargo space to allow handling of piece goods.

16 Claims, 11 Drawing Figures

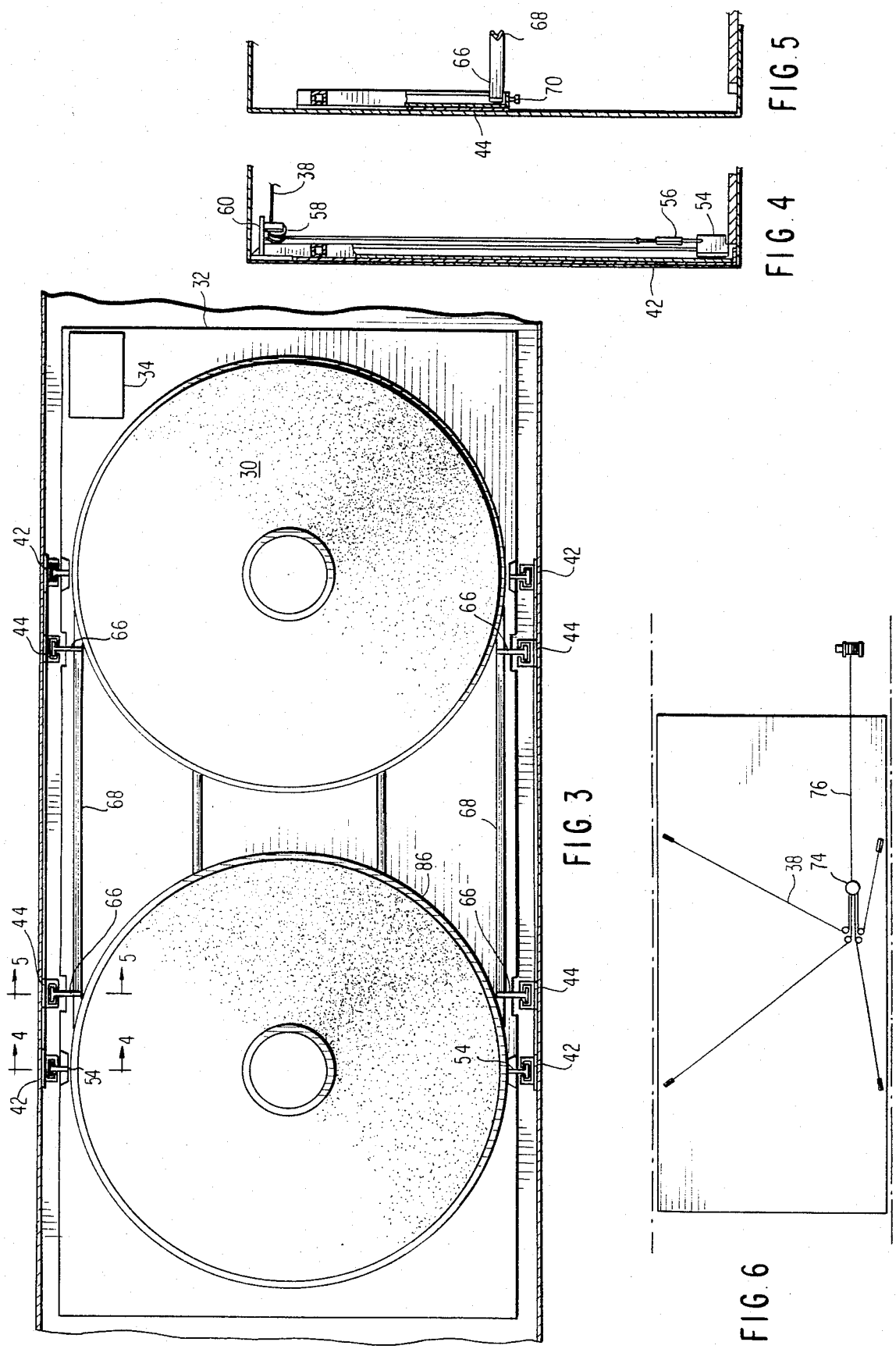

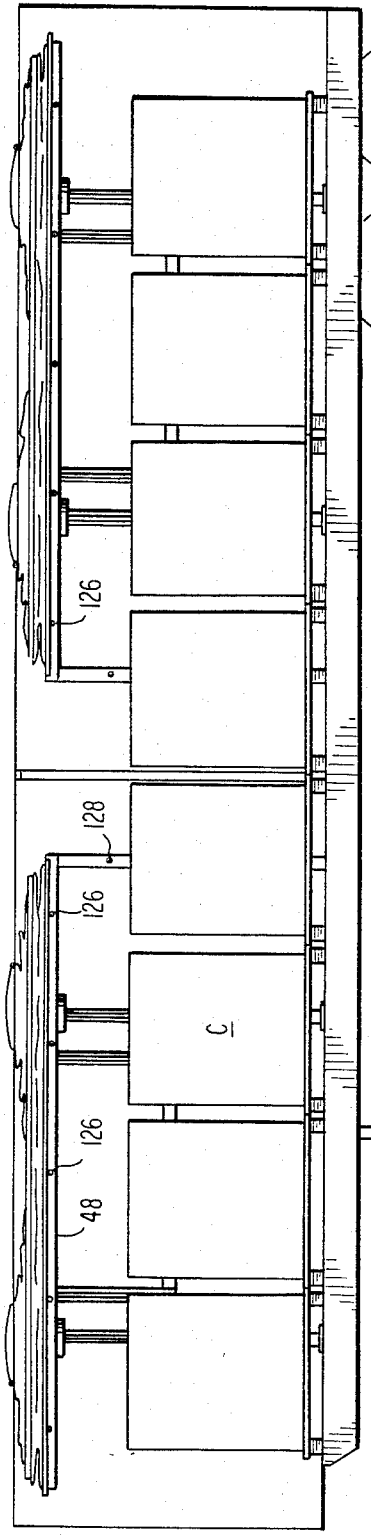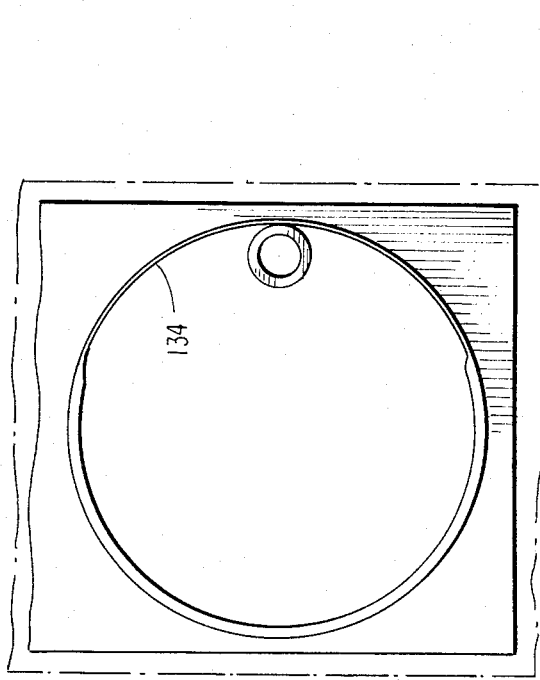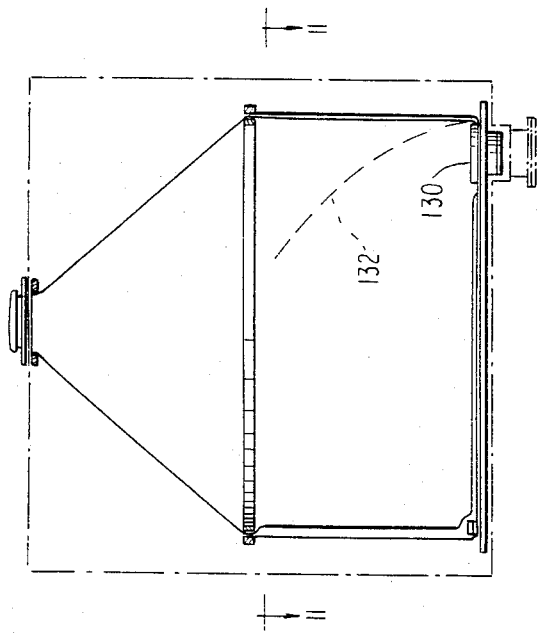

FREIGHT VEHICLE WITH A CONVERTIBLE CARGO SPACE

BACKGROUND OF THE INVENTION

1. Field of the Invention

This invention relates to improvements in freight vehicles having a cargo space convertible for handling piece goods or bulk granular material.

2. Prior Art

The desirability of having the cargo space of a freight vehicle which would be suitable for handling either piece goods or bulk goods is well known. The obvious advantage is that the same cargo space on the same vehicle could handle either of these two significantly different types of loads. Convertability of cargo space provides extreme flexibility and prevents empty runs of the vehicle. For example, a truck-trailer could handle piece goods such as palletized bags of sugar on one run and on a return run could handle bulk goods such as sugar in the bulk going back to the packaging factory; a plastics company could send finished goods in standard cargo space and return with a bulk load of resin; a brewer could send kegs or cases of beer and bring back malt or grains in the same vehicle.

"Freight vehicle" encompasses any vehicle which could contain freight or cargo as used herein, including without limitation trucks, truck-trailers, railway cars, and movable containers such as are transported by ship, aircraft, truck and rail, as well as intermodal vehicles. "Piece goods" includes ay any individual item such as packaged or palletized goods commonly handled as individual pieces. "Bulk goods" includes any of the known and commonly shipped bulk granular material, the only limitation being that the material be generally free-flowing so as to partially discharge by the action of gravity.

Various convertible freight vehicles are already known, hwoever, the known types all have certain disadvantages. For example, a van sold by Converta-Vans, Inc. of Wescoville, Pa., provides a cargo space with four separate convertible bulk hoppers utilizing gravity discharge from the hoppers and hinged floor sections above the hoppers. These hoppers make the van expensive and heavy, and the weight contributes to the energy expanditure of hauling. Moreover, general cargo vans are not easily converted to the Converta-Van configuration due to the necessity of providing the hoppers.

There also exists patented prior art on convertible freight vehicles, including U.S. Pat. No. 4,092,051, granted May 30, 1978. This patent similarly uses hoppers at the bottom of the bulk cargo space to assist in providing complete gravity discharge. The disadvantages of this hopper containing vehicle are substantially the same as for the Converta-Van product.

In U.S. Pat. No. 4,241,947 granted Dec. 30, 1980, there is shown a collapsable bulk storage member with slatted side walls, but it also has a fixed hopper-shaped bottom discharge. It is also a subject to the same limitations as present in the Converta-Van.

Thus, there is need in the art to provide a simple and inexpensive convertible cargo space in a freight vehicle which does not use hopper bottoms and which can be applied to conventional and existing freight vehicles with a minimum of modifications. This invention provides such need.

It is also known in the art to provide stationary bins for discharging free-flowing granular material which do not use hopper bottoms. See, e.g. British Pat. No. 1,144,162. However, such stationary units are not adaptable for converting piece goods cargo space to handle bulk goods.

SUMMARY OF THE INVENTION

This invention provides a freight vehicle having a cargo space convertible for handling either piece goods or bulk granular material without the use of hopppers and with only minor modifications which add little weight to existing and known cargo space constructions now used for piece goods. More particularly, a cargo space for piece goods is provided with openings in the roof and floor for filling and discharging bulk granular goods. A flexible, inflatable, double-wall general cup-shaped bag with connections to the fill opening and the discharge opening is provided for holding the bulk granular material. The material, after being emptied to the extent allowed by gravity and the material's angle of repose, is then further emptied by inflation of the bag to nudge the additional material to the discharge opening. The bag rests on a movable bag support platform member which, when the cargo space is used for piece goods, is raised and stored with the bag above it at a position just under the roof of the cargo space.

BRIEF DESCRIPTION OF THE DRAWINGS

FIG. 3 is a top plan view of a pair of bulk carrier cargo bags on a liftable rigid support or platform.

FIG. 4 is a sectional view taken along line 4—4 of FIG. 3 and showing platform guide details.

FIG. 5 is a sectional view taken along line 5—5 of FIG. 3 and showing retention ring guide details.

FIG. 6 is a schematic view of the hoisting mechanism and arrangement for raising the bag supporting platform.

FIG. 9 is a side elevation view of the cargo space similar to FIG. 1 with the bulk carrier bags stowed under the roof and the cargo space filled with containers (piece goods).

FIG. 10 is a side elevation view of a modification of one of the bulk carrier bags showing a side discharge arrangement.

FIG. 11 is a sectional view taken along line 11—11 of FIG. 10.

DETAILED DESCRIPTION OF PREFERRED EMBODIMENTS

Figure 1:
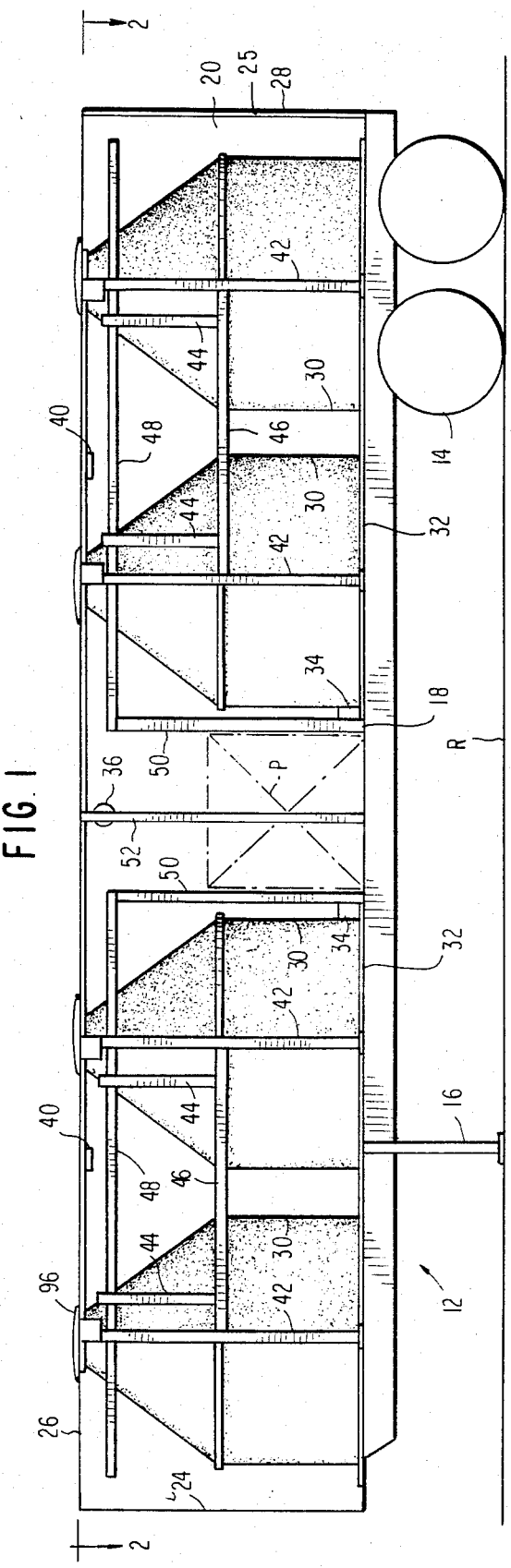
FIG. 1 is the side elevation view with the side wall removed to view the inside of the covertible cargo space showing this invention in the form for hauling bulk cargo, the view being taken along line 1—1 of FIG. 2.

As shown in FIG. 1 a freight vehicle is in the form of a conventional semi-trailer, although it could be any other cargo containing space. In the form shown in FIG. 1 the trailer has wheels 14 and a conventional support 16 for movement over a roadway R.

The cargo space of the trailer 12 has a conventional flat floor 18, side walls 20 and 22, a front-end wall 24, top wall 26, and a rear wall 28 which may conveniently contain access doors 25 as is conventional in such semi-trailers. The trailer thus described is a conventional common semi-trailer of the type used to haul cargo with trucks, the cargo typically handled is piece goods.

The cargo space of trailer 12, however, in the present invention, is also adapted to haul bulk cargo in bulk cargo bags 30. As shown in FIG. 1 there are four identical bulk cargo bags which are positioned in pairs on rigid platforms or bag bottom supports which are raisable from the position for hauling bulk cargo as shown in FIG. 1 to a storage position so that the cargo space may be used for hauling piece goods as shown in FIG. 9.

Each of the bulk cargo bags 30 is a double wall cup-shaped bag and discharges its cargo first by gravity and then by pneumatically assisted gravity discharge as disclosed in copending application Ser. No. 257,604, filed Apr. 27, 1981, U.S. Pat. No. 4,421,250 granted Dec. 20, 1983. In order to provide the air for inflating the bags each plaform carries a conventional blower 34 with suitable connections (not shown) to inflate the space between the walls of the bag.

For raising the platforms 32 and hence moving the bags from bulk storage position to the stowage position there is provided a winch 36 and a plurality of cables 38. These cables extend from four points on the platform vertically upward and then across the top of the storage space to a pulley box 40, see FIGS. 2, 4, and 6.

Positioned against the side walls of the cargo space are platform guide rails 42 which extend from a footing on the floor to the ceiling of the cargo space adjacent the side walls. See FIGS. 1, 3, and 4. These platform guide rails provide a vertical channel as shown in FIG. 3. Also extending vertically upwardly on the sides of the cargo space are retention guide rails 44 connected to and extending upwardly from the cross member 46. See FIGS. 1, 3, and 5. A top support rail 48 extends longitudinally along the sides and is supported by the form guide rails 42 and a vertical support beam 50 the top beam 48 provides the support for stowing the cargo bags in the stowage position of FIG. 9. A center post 52 on the side walls of the cargo space may provide a suitable support for the winch 36 via a cross beam 51. As shown in FIG. 1 a plurality of pallets P may be stored in an upright position in the space between the vertical beams 50 and removable transverse rods (not shown) extending from side to side and held at appropriate levels in vertical beams 50 preventing the pallets P from shifting into the area of the bulk carrier bags.

As shown in FIG. 3 a T-shaped guide member 54 is connected to the platform 32 and has its head within the channel platform guide rail 42. There are four of such members as shown in FIG. 3 in order vertically guide each platform as it is being raised by the cable 36. As shown in FIG. 4 the cable is connected via an adjustable connection such as turnbuckle 56 and extends upwardly over a pulley 58 held in a pulley bracket 60 from whence it is guided across the top of the cargo space to the pulley box 40, see FIGS. 4 and 6.

Figure 2:
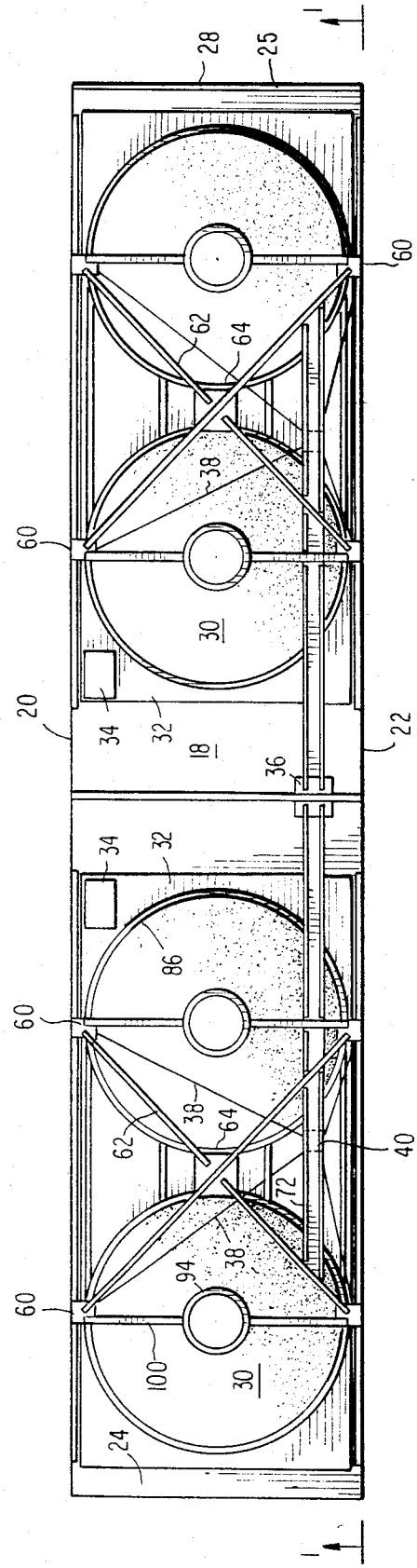
FIG. 2 is a top plan view of the cargo space of this invention with the top removed to view the top of the space and taken along line 2—2 of FIG. 1.

As shown in FIG. 2 suitable supports such as ceiling cross members 62 connected by a connection plate 54 utilized to provide support for the pulley box 40 via support rails 72.

Another slide 66 with a T-shaped head on the end connected to an angle member 68 between adjacent bags. An adjustable ring stop 70 is utilized to level and adjust within limits the vertical position of the bag retaining rings connected to angle 68.

From the pulley box 40 the four cables 38 are lead to a common connector 74 from whence a single heavier cable 76 leads to the winch 36, see FIG. 6.

Figure 7:
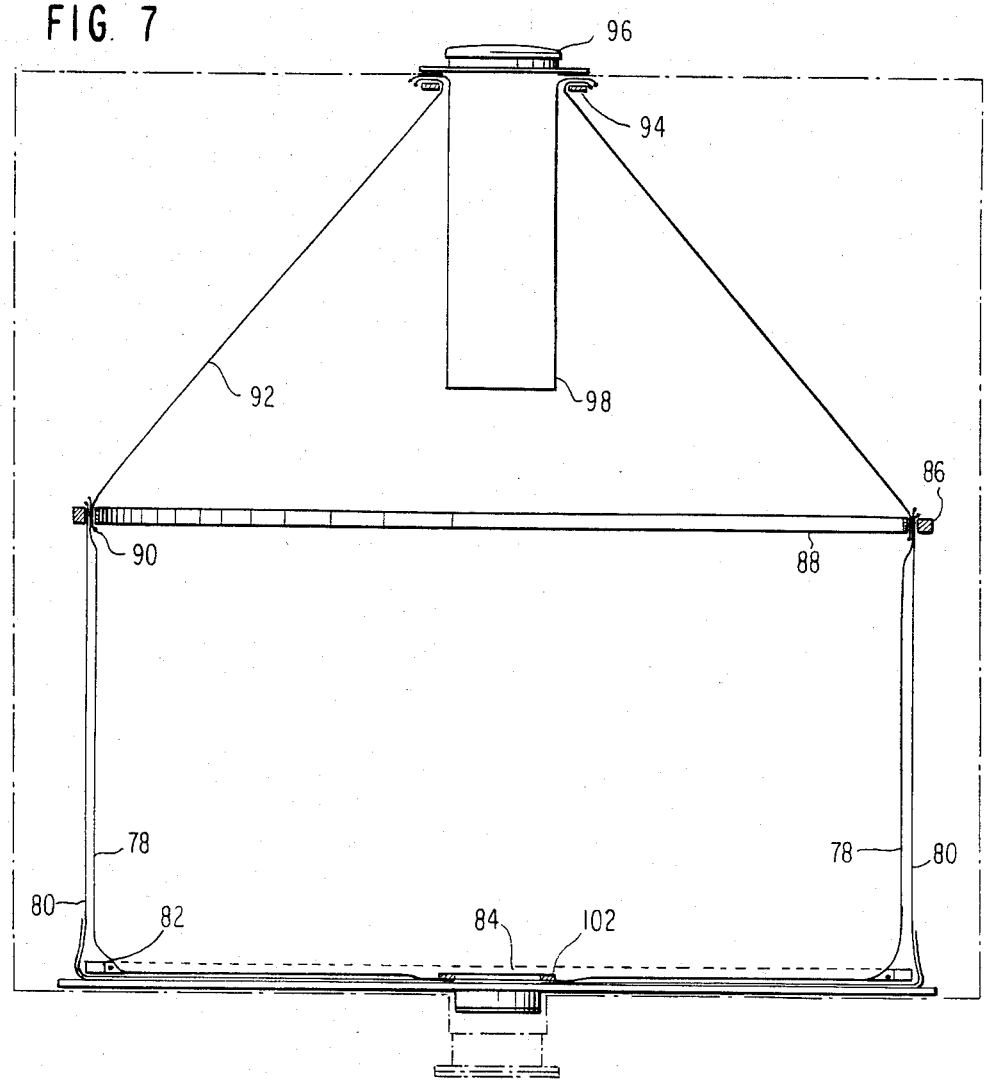
FIG. 7 is an elevation view of one bulk carrier bag in its erected position.

Referring now to FIG. 7 for some of the details of each of the bulk cargo bags 30, it can be seen that each bag has a generally cup-shaped inner bag wall 78 and a similarly shaped outer bag wall 80. A vacuum ring 82 is perforated to draw the inner bag wall 78 to its original position shown in FIG. 7 after a discharge cycle. The inner and outer wall bags have an outlet 84 therethrough in the bottom. Adjacent the top of the cup-shaped walls there is a bag retainer ring 86 of rigid material such as metal on the outside of each bag, and an inner bag ring 88. These bag rings are clamped together by suitable means not shown, and the roped ends of the inner and outer bag walls 78 and 80 are held between them. A roped end 90 is also on the edge of a flexible bag top covering 92 which extends from the retainer ring 86 to the top of the cargo space where it is held by a ring 94 secured to the top of the cargo space.

Each bag is provided with a removable fill cap arrangement 96 and a flexible fill tube 98. Referring to FIG. 2 a sealable structural support member 100 is located in the ceiling to support the fill tube indirectly from the side supports 42 and the floor of the cargo space. It is desirable that as much of the load as possible be supported from the floor of the cargo space, not the side walls or the roof.

Figure 8:
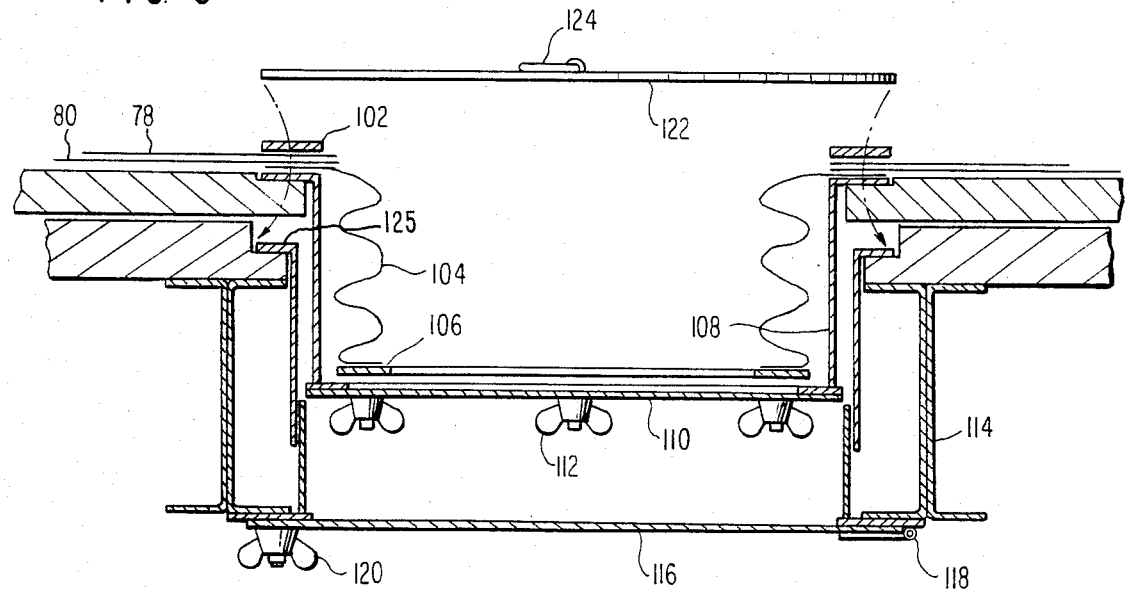
FIG. 8 is a detailed sectional elevation view of a bottom discharge opening from the bulk carrier bag.

Referring now to FIG. 8 and the details of the outlet, there is shown an outlet clamp ring 102 clamping the ends of the inner bag wall 78 and outer bag wall 80 as well as an outlet sleeve 104 flexible extensible material. The other end of sleeve 104 has an annular outlet connector 106.

An outlet box 108 having a removable closure plate 110 is secured by wing nuts 112 or the like. A beam 114 of the conventional semi-trailer provides the support for a discharge plate 116 hingedly connected thereto by hinge 118 and itself secured by a wing nut 120. For covering the opening 84 when the platform 32 is raised to the bag stowage position there is provided a floor cover plate or plug 122 having a suitable grasping means such as handle 124 to fit on ledge 125 as shown by the phantom lines in FIG. 8.

Referring now to FIG. 9 a plurality of transverse support rods 126 of a removable type may be positioned between the top beams 48 after the winch raises the platforms 32 so that the platforms rest on beams 126 and do not apply tension to the winch cable. Similar supports for these transverse bars are shown at 128 in vertical beams 50 in order to hold the pallets P in FIG. 1.

FIGS. 10 and 11 show a modification of this invention. In each the outlet from the bag 30 is at the edge rather than in the center of the bag. As shown in FIG. 10 the bag outlet 130 is adjacent the periphery of the inside of the bag. A heat seal 132 seals the inner and outer bag liners together in the area 134 so that when air pressure is applied to the inside of the bag only the portion removed from the area of the outlet will be first inflated.

In operation the trailer 12 may be used to haul bulk cargo by having the bags in the position shown in FIG. 1. Dry granular free-flowing material such as sugar, rice, plastic pellets, or the like may be inserted through the fill opening 26 to fill the bags 30 to an appropriate level. The bottom opening 84 is closed in the conditions shown in FIG. 8 then the empty pallets P may be stowed in the area shown in FIG. 1 with the transverse rods holding them in position. A truck tractor can then haul the bulk cargo to location and the bulk cargo may then be discharged. For discharging, the outer plate 116 is allowed to swing open. Flexible sleeve 104 extends downwardly due to the weight of the material therein discharge plate 110 may be removed so that the connector plate 106 can be connected up to the desired discharge pipe, usually leading to a conventional conveyor. Material is then allowed to flow by gravity out of the bag 30 until its angle of repose is reached. Then therefrom blower 34 is applied by connections (not shown) to the space between bag walls 78 and 80 causing the top edge of the bag wall to move inwardly to nudge additional material over its angle of repose. This action of fluid-assisted gravity discharge is described in copening applications Ser. No. b 307,089, filed Sept. 30, 1981 and Ser. No. 357,359, filed Mar. 12, 1982. If desired the other features disclosed in these applications such as top cushioning or starting ring and automatic controls may also be utilized within the general scope of this invention. After completely discharging the bulk cargo by gravity assist the inner wall 78 is brought back to its original position by applying vacuum to the vacuum ring 82, this can also be conveniently applied via blower 34 by suitable connections such as disclosed in my application Ser. No. 465,707, filed Feb. 11, 1983.

If the next trip of the trailer 12 is for hauling piece goods, such as containers of goods loaded on pallets as shown in FIG. 9 the winch 36 is activated to cause the cables 38 and and 76 to raise the platforms 32 to the position shown in FIG. 9 and then the transverse rods 126 are put under the platform to hold it in position with the collapsed bags then stowed just under the ceiling or roof of the cargo thus leaving plenty of room for the containers C resting on their pallets on the floor of the trailer.

As can be seen this invention can be applied to existing semi-trailers. For converting an existing trailer all that need be done is provide openings in the floor and ceiling for the fill and discharge and then apply the inexpensive light weight components of this invention.

This invention provides tremendous advantages in converting a cargo space for piece goods selectively into cargo space for bulk goods without the large heavy hoppers conventionally used and thus at a much less weight which is saving of energy as well as construction and manufacturing costs.

What is claimed is:

1. A freight vehicle having a cargo space convertible from a space suitable for piece goods to a space suitable for bulk granular aterial, the vehicle comprising;
   (a) means defining a cargo space having a load-bearing bottom floor, side walls and end walls, and a roof,
   (b) door means providing access to the cargo space for loading and unloading piece goods cargo therein,
   (c) means defining at least two discharge openings in the bottom floor for emptying bulk, granular material cargo from the cargo space,
   (d) at least two inflatable double-walled, generally cup-shaped bags for containing bulk cargo, each bag having an opening in its bottom positioned to register with one of the openings in the floor of the cargo space, each bag having a width dimension when the space between the bag walls is inflated less than the distance between the cargo space side walls so that none of the bags contact the cargo space side walls,
   (e) a rigid bag bottom support platform means having openings therethrough in registery with the discharge openings in the bags and in the floor, the platform means positioned beneath the bag bottom, secured to the bag bottom and resting on and transmitting the weight of bulk cargo in the bag to the floor and not to the side walls when the cargo space is used in a bulk material handling mode,
   (f) means for raising and lowering the bag bottom support platform means from the floor of the cargo space to a position with the bag support platform adjacent to the roof of the cargo space with the bag collapsed, to thereby convert the cargo space to space suitable for piece goods handling,
   (g) mechanical means on the cargo space side walls for maintaining the bag in an erected position when the bag support platform means is on the floor and the cargo space is in the bulk handling mode, and for maintaining each bag spaced from the cargo space side walls during operation of the raising and lowering means,
   (h) a fill opening means in the roof of the cargo space,
   (i) a flexible member means connected to the fill opening means and connected to the top of each bag to provide an enclosure for the area around the fill opening means to the top of each bag,
   (j) means for inflating and deflating the space between the walls of each bag, the inflation causing expansion of the inner wall from the top downward to assist in gravity discharge of the granular bulk material after its angle of repose is reached.

2. A freight vehicle as defined in claim 1 further comprising a flexible fill pipe extending downwardly into the bag from the fill opening.

3. A freight vehicle as in claim 1 further comprising an annular ring around the top of the outer wall of the cup-shaped bag.

4. A freight vehicle as in claim 3 wherein the mechanical means includes supports on the side walls of the cargo space cooperating with an annular ring around the top of the cup-shaped bag to also prevent shifting of the annular ring.

5. A freight vehicle as in claim 4 further comprising a pair of bags supported on a single platform and means rigidly connecting annular rings on the bags.

6. A freight vehicle as in claim 1 further comprising a perforated tubular member between the walls of the bag adjacent the outer bottom periphery of the cup-shaped bag for evacuating the space between the walls of the bag after a discharge operation.

7. A freight vehicle as in claim 1 wherein the discharge opening is provided with a removable cover and further comprising a discharge means including a flexible spout extending downwardly from the discharge opening in the bag.

8. A freight vehicle as in claim 1 further comprising a plug plate to cover the discharge opening in the floor of the cargo space when the cargo space is used for piece goods and not used for bulk granular material.

9. A freight vehicle as in claim 1 wherein the means for raising and lowering of the bag support and bag include cable and pulley means.

10. A freight vehicle as in claim 1 wherein there are a pair of individual bags on each support platform means, each bag having a rigid annular ring and the annular rings being connected together.

11. A freight vehicle as in claim 10 wherein the means for raising and lowering are common to each bag support platform.

12. A freight vehicle as in claim 1 wherein the means for raising and lowering include cables connected from the bag support platform through pulleys to a winch.

13. A freight vehicle as in claim 1 further comprising means for supporting the bag and bag bottom support platform in its upper-most position, the piece goods handling mode, independently of the cables and winch.

14. A freight vehicle as defined in claim 13, wherein such means for supporting include removable cross bars, positionable beneath the support platform and detachably connected to the cargo space side walls.

15. A freight vehicle of the type having a cargo space defined by a top, side walls, and end walls, including at least one access opening thereto, and a load-supporting bottom capable of handling and carrying piece goods, a construction for converting the cargo space selectively to a cargo space for handling free-flowing bulk granular material, the construction comprising:
 (a) means defining a discharge opening in the load supporting bottom for emptying bulk granular cargo material from the cargo space,
 (b) means defining a fill opening in the top of the cargo space for loading bulk cargo into the cargo space,
 (c) at least one inflatable double-walled, generally cup-shaped bag for containing bulk cargo, the bag having an opening in its bottom positioned to register with the opening in the floor of the cargo space and being in fluid communication with the opening in the floor of the cargo space, the bag having a width dimension when the space between the bag walls is inflated which is less than the distance between the side walls of the freight vehicle,
 (d) a rigid bag bottom support platform having an opening in registry with the discharge opening in the bag and in the floor, the platform positioned beneath the bag bottom and secured to the bag bottom and resting on and transmitting the weight of bulk cargo in the bag to the floor and not to the side walls when the cargo space is used in a bulk handling mode,
 (e) means for raising and lowering the bag bottom support platform from the floor of the cargo space to a position with the bag collapsed and bag support platform adjacent the roof of the cargo space in order to convert the cargo space from that for handling bulk cargo to space suitable for handling piece goods,
 (f) mechanical means connected to the side walls of the freight vehicle for maintaining the bag in an erected position when the bag support platform is on the floor and the cargo space is used in a bulk handling mode, and for maintaining each bag spaced from the cargo space side walls during operation of the plaform raising and lowering means,
 (g) means for inflating and deflating a space between the double walls of the bag, the inflation causing expansion in the inner wall to assist in gravity discharge of the granular material after its angle of repose is reached.

16. An assembly for converting a freight vehicle having cargo space suitable for piece goods to that having capability of handling bulk granular material and to reconvert to handle piece goods, the freight vehicle being of the type having a cargo space with a load-bearing bottom floor, side walls, end walls and a roof, the cargo space also having means providing access thereto for loading and unlaoding piece goods therein, means defining at least two discharge openings in the bottom floor of the cargo space for allowing bulk granular material cargo to exit therefrom and means in or adjacent the roof of the cargo space for loading bulk material thereinto, an installable assembly for allowing the conversion from piece goods to bulk granular cargo, the assembly comprising:
 (a) at least two inflatable double-walled, generally cup-shaped bags for containing bulk cargo, each bag having an opening in its bottom positioned to register with an opening in the floor of the cargo space, each bag having a width dimension between the walls when the bag is inflated less than the distance between the cargo space side walls so that none of the bags contact the cargo space side walls,
 (b) a rigid bag bottom support platform having openings therethrough in registry with the discharge openings in the bags and in the floor, the platform positioned beneath the bag bottom, secured to the bag bottom and resting on and transmitting the weight of bulk cargo in the bag to the floor and not to the side walls when the cargo space is used in a bulk material handling mode,
 (c) means for raising and lowering the bag bottom support platform from the floor of the cargo space to a position with the bag support platform adjacent the roof of the cargo space with the bag collapsed to thereby convert the cargo space to space suitable for piece goods handling,
 (d) mechanical means on the cargo space side walls for maintaining the bag in an erected position when the bag support plaform means is on the floor and the cargo space is in the bulk handling mode, and for maintaining each bag spaced from the cargo spaced side walls during operation of the platform raising and lowering means, and
 (e) means for inflating and deflating the space between the walls of each bag, the inflation causing expansion of the inner wall from the top downwardly to assist in gravity discharge of granular bulk material after it reaches its angle of repose.

* * * * *

UNITED STATES PATENT AND TRADEMARK OFFICE
CERTIFICATE OF CORRECTION

PATENT NO. : 4,534,596
DATED : August 13, 1985
INVENTOR(S) : Timothy C. Bonerb

It is certified that error appears in the above-identified patent and that said Letters Patent is hereby corrected as shown below:

Col. 3, line 63, delete "54" and insert therefor -- 64 --.
Col. 5, line 18, between "No." and "307,089", delete "b".

Signed and Sealed this

Eighteenth Day of November, 1986

*Attest:*

DONALD J. QUIGG

*Attesting Officer*  *Commissioner of Patents and Trademarks*